No. 770,185. PATENTED SEPT. 13, 1904.
M. MITCHELL.
SEED DRILL.
APPLICATION FILED JAN. 21, 1903. RENEWED FEB. 10, 1904.
NO MODEL.
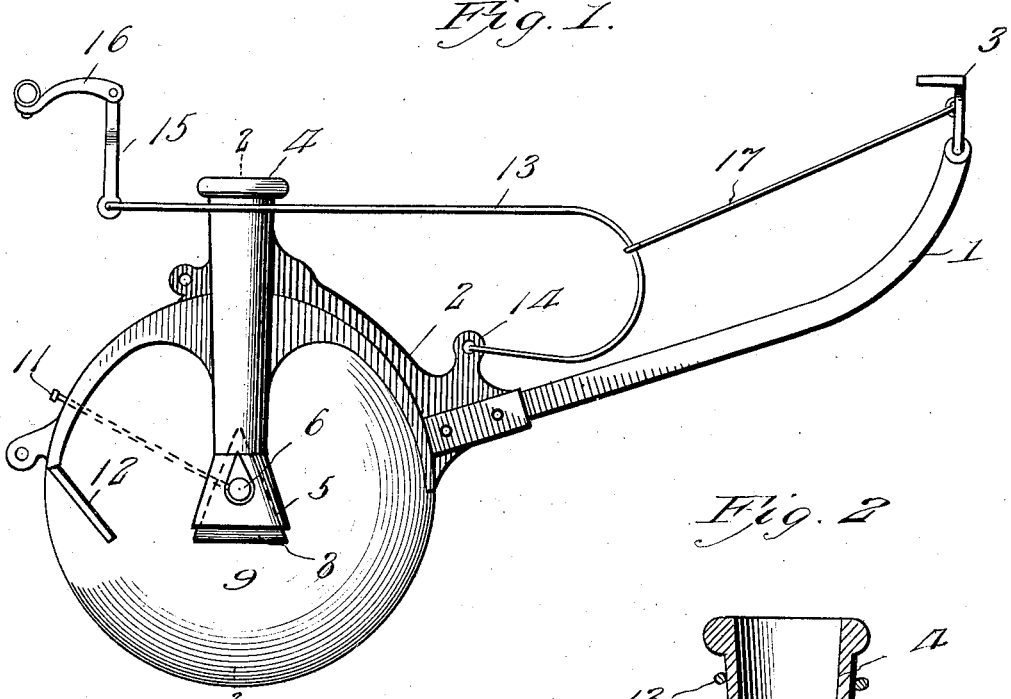
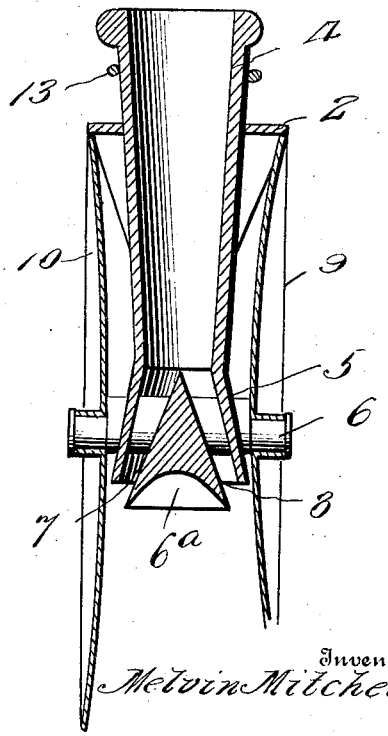
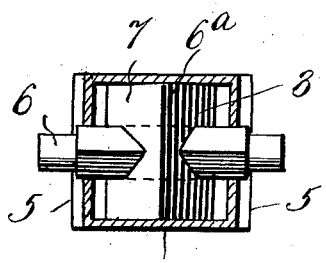
Inventor
Melvin Mitchell,
Witnesses
By Victor J. Evans
Attorney No. 770,185. Patented September 13, 1904.

UNITED STATES PATENT OFFICE.

MELVIN MITCHELL, OF MADISON, WISCONSIN.

SEED-DRILL.

SPECIFICATION forming part of Letters Patent No. 770,185, dated September 13, 1904.

Application filed January 21, 1903. Renewed February 10, 1904. Serial No. 193,015. (No model.)

*To all whom it may concern:*

Be it known that I, MELVIN MITCHELL, a citizen of the United States, residing at Madison, in the county of Dane and State of Wisconsin, have invented new and useful Improvements in Seed-Drills, of which the following is a specification.

This invention relates to seed-drills, but more particularly to a seed-distributing device therefor.

One of the principal objects of the invention is to produce a double-disk furrow-opener in combination with a peculiarly-novel seed-distributer whereby the grain will be equally spread at the bottom of the furrow, so that the difficulties arising from the grain adhering too closely together will be obviated.

With this object in view the invention consists in the novel construction of the grain-boot, the lower end of which is flared and receives a wedge-shaped deflector carried by an axle on which the grain boot and disks are secured, the side walls of the deflector being parallel with the inner walls of the grain-boot, whereby the grain will be directed from opposite sides of the boot against the disks, causing it to be scattered or spread as it enters the furrow.

Other novel details of construction will be set forth in the following description, reference being had to the accompanying drawings, in which—

Figure 1 is a side elevation of a device constructed in accordance with my invention, one of the disks being removed. Fig. 2 is a vertical cross-sectional view on the line 2 2 of Fig. 1. Fig. 3 is a cross-sectional view through the seed-boot, the deflector being shown in plan.

The reference-numeral 1 designates a drawbar secured to the grain-guard 2 at one end and pivoted at the opposite end to a bracket 3, depending from the frame of the machine. Formed integral with the guard 2 is the seed-boot 4, which comprises an elongated tube, the lower end of which is provided with a flared mouth or discharge-opening 5. An axle 6 extends transversely through the flared portion of the tube, being angular intermediate its ends, the opposite sides being inclined from its uppermost extremity toward the bottom of the tube. A deflector $6^a$ is arranged within the tube and is disposed at a right angle to the axle, having inclined sides 7 and 8, said sides being approximately parallel with the sides of the discharge end of the tube, so that the grain will readily pass off in opposite directions, being deflected toward the convex surfaces of the furrow-openers 9 and 10. These furrow-openers are journaled in any suitable manner between the restricted ends of the axle 6, and as the seed-boot and deflector are interposed between them it will be apparent that the grain will readily be directed in a proper manner to enter the furrows opened by the disks 9 and 10. These disks can be lubricated through the medium of a tube 11, which extends from the axle to a suitable point on the guard. On one end of the guard is formed a scraper 12, which will remove any accumulations of dirt or earth that may adhere to the disk.

The reference-numeral 13 designates a curved spring secured at one end to the ear 14, carried by the forward end of the guard, and at its other end to a depending link 15, pivotally secured to an arm 16, suitably supported to the rear of the machine. This spring is held in proper relative position by a tie-rod 17, fastened thereto at the curved portion thereof and to the bracket 3. As will be readily understood, this spring is for the purpose of normally exerting pressure upon the disks to force them in contact with the earth; but the springs possess sufficient flexibility to permit the disks to rise over any inequalities of the ground. Of course it will be understood that a suitable hopper with a valve mechanism will be arranged above the boot, whereby the grain can be dropped at intervals; but this mechanism forms no part of my invention, and I have not deemed it necessary to illustrate it here.

It will be apparent that by arranging a deflector $6^a$ within the bottom of the boot and associating it with the angular axle, as illustrated in Fig. 3, any grain which drops into the boot will be discharged by gravity through the discharge-opening thereof, the particles of the grain being effectually disassociated before being directed into the furrows.

Having thus described my invention, what I claim as new, and desire to secure by Letters Patent, is—

1. In a device of the character described, the combination with an axle having an angular intermediate portion and journals on its respective ends, of disks carried by the journals, a seed-boot interposed between the disks and carried by the axle, said boot fitting over the angular portion thereof and provided with a depending flared discharge end, an angular deflector carried by the axle and located within the flared outlet end of the boot, said deflector being arranged at a right angle to the axle.

2. In a seed-drill the combination with an axle, of a seed-boot carried thereby having a depending flared end, a wedge-shaped deflector carried by the axle, the side walls of the deflector being parallel with the inner walls of the grain-boot.

3. In a seed-drill, the combination with an angular axle the ends of which form journals, of disks carried by the journals, a seed-boot carried by the axle and interposed between the disks and a wedge-shaped deflector located on the axle and extending within the discharge end of the boot.

In testimony whereof I affix my signature in presence of two witnesses.

MELVIN MITCHELL.

Witnesses:
W. O. THOMAS,
RICHARD B. RAMIEU.